United States Patent
Cheong et al.

(10) Patent No.: US 6,735,284 B2
(45) Date of Patent: May 11, 2004

(54) SYSTEM FOR CONTROLLING MOTOR AND METHOD FOR THE SAME

(75) Inventors: Dal Ho Cheong, Seoul-si (KR); June Hee Won, Seoul-si (KR); Jae Yoon Oh, Kwangmyung-si (KR); Kyung Hoon Lee, Seoul-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/412,249

(22) Filed: Apr. 14, 2003

(65) Prior Publication Data
US 2004/0070364 A1 Apr. 15, 2004

(30) Foreign Application Priority Data
Oct. 10, 2002 (KR) .......................... 2002-61858

(51) Int. Cl.[7] ................................. H02P 5/34
(52) U.S. Cl. .................. 378/801; 318/804; 318/807
(58) Field of Search ................. 378/801, 804, 378/807, 798, 716, 432, 434, 609, 809

(56) References Cited

U.S. PATENT DOCUMENTS 5,796,236 A * 8/1998 Royak .................... 318/804
5,854,547 A * 12/1998 Nakazawa ............... 318/716
5,949,210 A * 9/1999 Gataric et al. ........... 318/609
6,315,081 B1 * 11/2001 Yeo ......................... 187/290

* cited by examiner

Primary Examiner—Karen Masih
(74) Attorney, Agent, or Firm—Greenblum & Bernstein, P.L.C.

(57) ABSTRACT

The present invention relates to a system and a method for controlling a motor. A rotation/fixed coordinates converter converts a reference magnetic flux voltage and a reference torque voltage of a rotation coordinates system into data of a fixed coordinates system, and outputs the data to the three-phase voltage generator. A fixed/rotation coordinates converter converts a three-phase current applied from the inverter to the motor into a two-phase current. An estimation unit estimates a rotation angle and rotor speed of the motor upon receiving currents applied to the fixed/rotation coordinates converter. A control block receives the estimated rotation angle and the estimated speed from the estimation unit, and outputs the reference magnetic flux voltage and the reference torque voltage of the motor to the rotation/fixed coordinates converter to compensate an error caused by loads generated when driving the motor. Thus, the control system greatly reduces noise and vibrations of a compressor without being affected by loads generated by compression/expansion strokes of the compressor at a startup time of the motor, and prevents a performance of the compressor from being deteriorated.

15 Claims, 6 Drawing Sheets

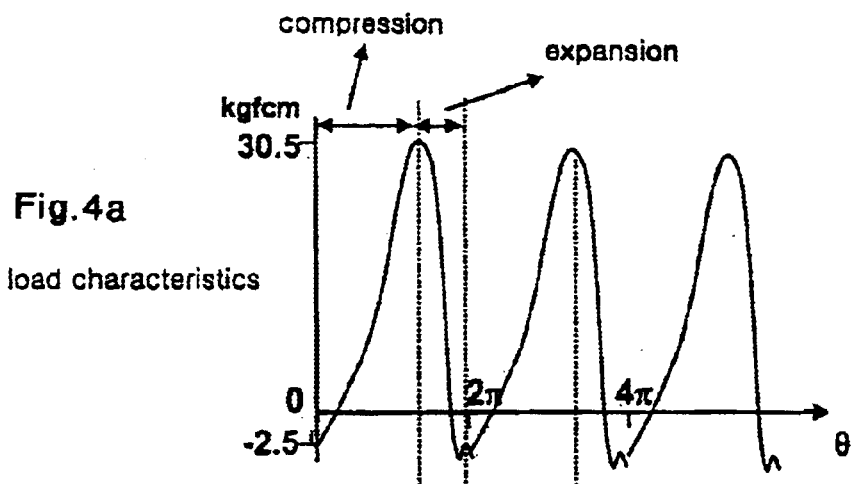
Fig.4a load characteristics
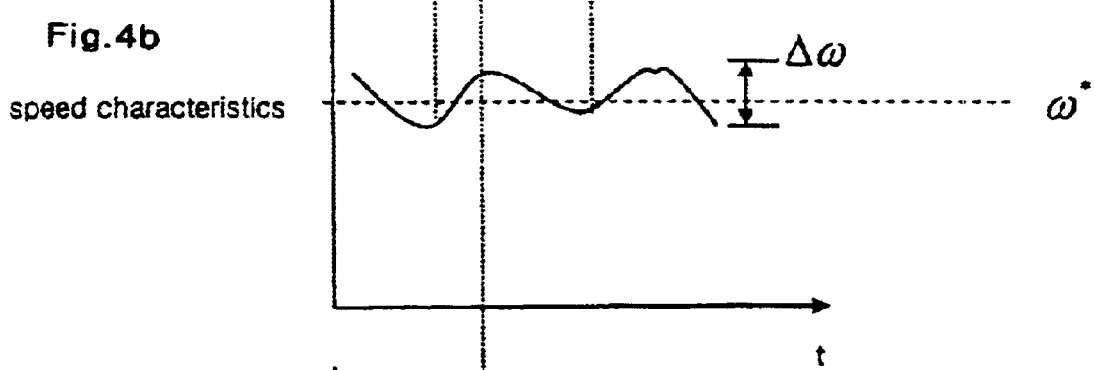
Fig.4b speed characteristics
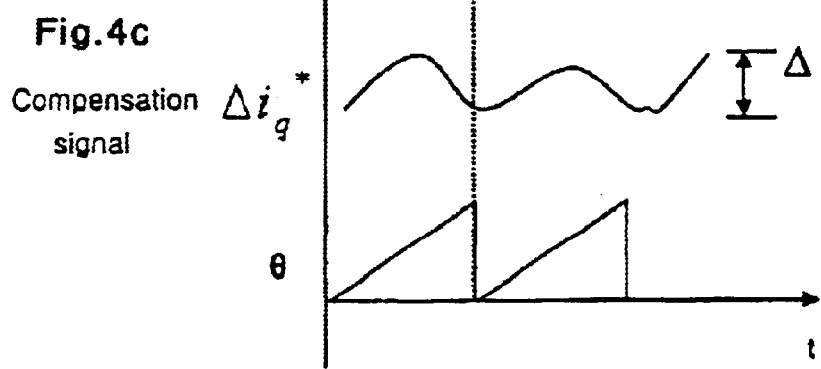
Fig.4c Compensation signal $\Delta i_q^*$

SYSTEM FOR CONTROLLING MOTOR AND METHOD FOR THE SAME

BACKGROUND OF THE INVENTION

1. Field of the Invention

The present invention relates to a system for controlling a motor, and more particularly to a system for controlling a motor, for removing speed ripples generated when controlling the motor and noise generated when driving the same, wherein the speed ripples are caused by loads generated when driving a single rotary compressor.

2. Description of the Related Art

Typically, in order to control a motor, there is a need for a motor control system to recognize speed information or magnetic flux information of the motor. A conventional motor control system has adapted a speed sensor, such as a resolver or pulse encoder, or a magnetic flux sensor to recognize the speed information and magnetic flux information, but these sensors have difficulty in their installation and are greatly affected by their installation environment, thereby unavoidably increasing the cost of production.

Therefore, there have been increasingly developed a variety of control systems for controlling the speed of the motor without using the speed sensor and the magnetic flux sensor. As shown in FIG. 1, a sensorless control system for the synchronous reluctance motor includes a three-phase voltage generator 3 for outputting a three-phase voltage to an inverter 2 driving the motor 1, an estimation unit 4 for estimating a rotor speed and rotation angle of the motor 1 upon receiving currents $i_u$ and $i_v$ transmitted from the inverter 2 to the motor 1, a first subtracter 5 for generating a difference between a reference speed $\omega^*$ of the motor 1 and an estimated speed $\omega$ generated from the estimation unit 4 by subtracting the estimated speed $\omega$ from the reference speed $\omega^*$, and a speed controller 6 for generating a reference torque current $i^*_q$ on the basis of the difference between the reference speed $\omega^*$ and the estimated speed $\omega$.

The sensorless control system for the synchronous reluctance motor further includes a fixed/rotation coordinates converter 7 for converting a value estimated by the estimation unit 4 into values $i_d$ and $i_q$ of a rotation coordinates system, a second subtracter 8 for generating a difference between the reference torque current $i^*_q$ and an output value of the fixed/rotation coordinates converter 7, a magnetic flux command generator 9 for generating a reference magnetic flux current $i^*_d$ according to the estimated speed $\omega$, a third subtracter 10 for generating a difference between the reference magnetic flux current $i^*_d$ and a real magnetic flux current $i_d$, a current controller 11 for generating a reference magnetic flux voltage $V^*_d$ and a reference torque voltage $V^*_q$ upon receiving output signals from the second subtracter 8 and the third subtracter 10, and a rotation/fixed coordinates converter 12 for converting an output value of the current controller 11 into values $V^*_\alpha$ and $V^*_\beta$ of a fixed coordinates system.

However, a single rotary compressor has load characteristics variable with a rotation angle of a motor as shown in FIG. 2a, such that speed characteristics of the motor are plotted on a time axis (t) as shown in FIG. 2b. In more detail, as compression and expansion strokes are performed simultaneously with driving vanes of the compressor, there may occur ripples of 60–100 rpm, shown in FIG. 2b on the time axis (t), on which the speed characteristics of the motor is plotted, such that these ripples result in undesired vibrations or noise of a compressor and performance deterioration thereof.

SUMMARY OF THE INVENTION

Therefore, the present invention has been made in view of the above problems, and it is an object of the present invention to provide a system for controlling a motor, which removes ripples that may deteriorate a motor's speed characteristic due to loads generated when driving a single rotary compressor, such that it removes vibrations or noise of a compressor and prevents a performance of the compressor from being deteriorated.

In accordance with the present invention, the above and other objects can be accomplished by the provision of a system for controlling a motor, including: a three-phase voltage generator for outputting a three-phase voltage to an inverter driving a motor; a rotation/fixed coordinates converter for converting a reference magnetic flux voltage and a reference torque voltage of a rotation coordinates system of the motor into data of a fixed coordinates system, and outputting the data to the three-phase voltage generator; a fixed/rotation coordinates converter for converting a three-phase current applied from the inverter to the motor into a two-phase current so as to convert currents of the fixed coordinates system into currents of the rotation coordinates system; an estimation unit for estimating a rotation angle and rotor speed of the motor upon receiving currents applied to the fixed/rotation coordinates converter; and a control block for receiving the estimated rotation angle and the estimated speed from the estimation unit, outputting the reference magnetic flux voltage and the reference torque voltage, in which an error caused by loads when driving the motor is compensated, to the rotation/fixed coordinates converter.

BRIEF DESCRIPTION OF THE DRAWINGS

The above and other objects, features and other advantages of the present invention will be more clearly understood from the following detailed description taken in conjunction with the accompanying drawings, in which:

FIGS. 4a to 4c are views illustrating a load characteristic graph, a speed characteristic graph, and a graph of compensation signal of the motor shown in FIG. 3, respectively;

DESCRIPTION OF THE PREFERRED EMBODIMENTS

Now, preferred embodiments of the present invention will be described in detail with reference to the annexed drawings.

Figure 1:
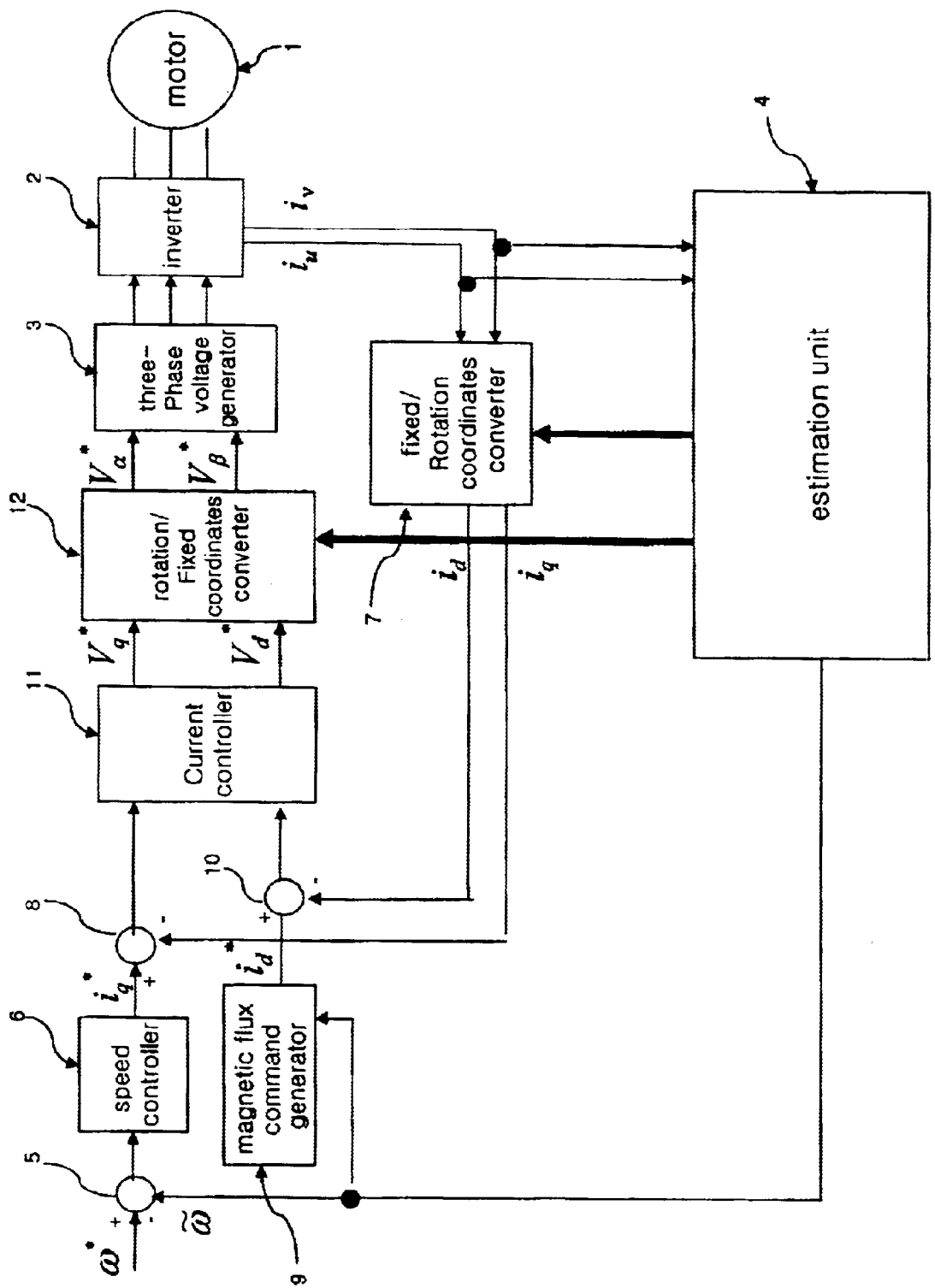
FIG. 1 is a block diagram of a conventional control system of a synchronous reluctance motor.
Figures 2A, 2B:
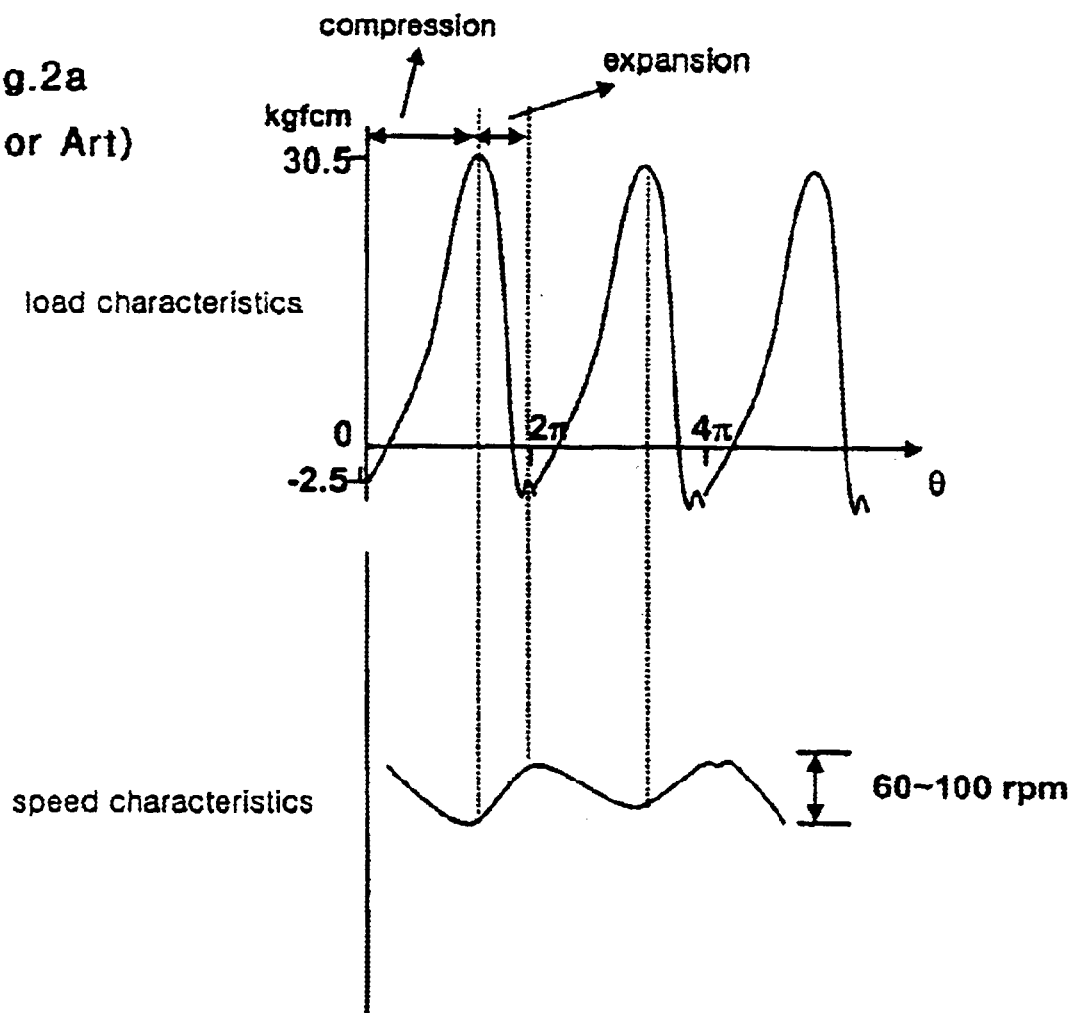
FIGS. 2a and 2b are views illustrating a load characteristic graph and a speed characteristic graph of a single rotary compressor, respectively.
Figure 3:
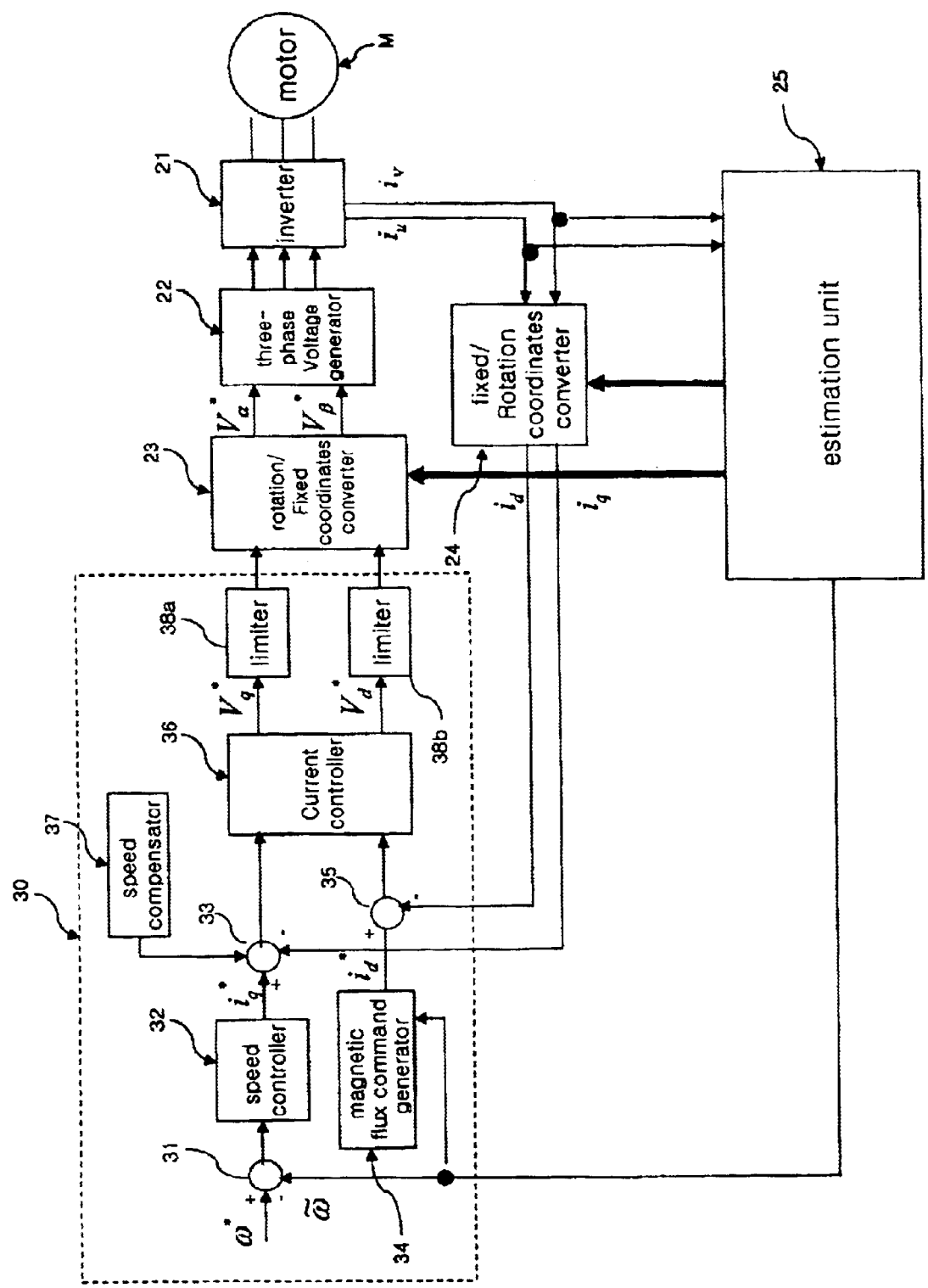
FIG. 3 is a block diagram of a control system of a motor in accordance with a preferred embodiment of the present invention.

FIG. 3 is a block diagram of a control system of a motor in accordance with a preferred embodiment of the present invention. Referring to FIG. 3, the control system of the motor M includes a three-phase voltage generator 22 for enabling an inverter 21 to drive the motor M according to a control signal of a microcomputer (not shown) by applying a three-phase voltage to the inverter 21, a rotation/fixed coordinates converter 23 for converting a reference magnetic flux voltage $V^*_d$ and a reference torque voltage $V^*_q$ of a rotation coordinates system of the motor M into a magnetic flux voltage $V^*_\alpha$ and a torque voltage $V^*_\beta$ of a fixed coordinates system, and outputting the magnetic flux voltage $V^*_\alpha$ and the torque voltage $V^*_\beta$ to the three-phase voltage generator 22, and a fixed/rotation coordinates converter 24 for converting a three-phase current ($i_u$, $i_v$, $i_w$) applied from the inverter 21 to the motor M into a two-phase current so as to convert currents of a fixed coordinates system into currents of a rotation coordinates system.

The control system of the motor further includes an estimation unit 25 for estimating a rotation angle and rotor speed of the motor M upon receiving currents $i_u$ and $i_v$ applied to the fixed/rotation coordinates converter 24, and outputting the estimated rotation angle and rotor speed of the motor M to the rotation/fixed coordinates converter 23 and the fixed/rotation coordinates converter 24, and a control block 30 for receiving the estimated rotation angle and the estimated speed ω from the estimation unit 24, and outputting the reference magnetic flux voltage $V^*_d$ and the reference torque voltage $V^*_q$ of the rotation coordinates system of the motor M to the rotation/fixed coordinates converter 23 so as to compensate an error caused by loads generated when driving the motor M.

Particularly, the control block 30 compensates ripples generated by the motor M's speed due to loads created when driving a compressor by outputting the reference magnetic flux voltage $V^*_d$ and the reference torque voltage $V^*_q$ of the rotation coordinates system to the rotation/fixed coordinates converter 23. Therefore, the control system for the motor can maximally prevent such ripples from being generated by the motor M's load.

The control block 30 includes a first subtracter 31 for generating a difference between a reference speed ω* of the motor M and a motor M's estimated speed ω of the estimation unit 25, a speed controller 32 for generating a reference torque current $i^*_q$ controlling a speed of the motor M upon receiving the difference between the reference speed ω* and estimated speed ω from the first subtracter 31, a second subtracter 33 for generating a difference between the reference torque current $i^*_q$ generated from the speed controller 32 and a real torque current $i_q$ generated from the fixed/rotation coordinates converter 24, a magnetic flux command generator 34 for controlling a magnetic flux according to the motor M's estimated speed ω to generate a reference magnetic flux current $i^*_d$, and a third subtracter 35 for generating a difference between the reference magnetic flux current $i^*_d$ and a real magnetic flux current $i_d$ generated from the fixed/rotation coordinates converter 24.

The control block 30 further includes a current controller 36 for generating a reference magnetic flux voltage $V^*_d$ and a reference torque voltage $V^*_q$ of the rotation coordinates system according to the difference between the currents $i^*_d$ and $i_d$, and outputting the reference magnetic flux voltage $V^*_d$ and the reference torque voltage $V^*_q$ to the rotation/fixed coordinates converter 23, and a speed compensator 37 for outputting a compensation signal $\Delta i^*_q$ compensating ripples generated in the reference torque current $i^*_q$ generated from the speed controller 32 to the second subtracter 33.

The speed compensator 37 generates the compensation signal $\Delta i^*_q$ according to loads determined by a rotation angle of the motor's rotor, or generates the compensation signal $\Delta i^*_q$ on the basis of ripple waveform generated at the estimated speed of the motor M. Preferably, there exists a phase difference 180° between the compensation signal $\Delta i^*_q$ and the ripple waveform. However, it should be noted that the ripples are reduced even though the phase difference 180° is not correctly provided between the compensation signal $\Delta i^*_q$ and the ripple waveform.

FIG. 4a is a load characteristic graph illustrating load characteristics caused by compression/expansion strokes of a compressor contained in the control system of the motor. Referring to FIG. 4a, the loads of the compressor periodically vary with the rotation angle of the motor's rotor.

FIG. 4b depicts the motor's estimated speed ω caused by the motor's load characteristics shown in FIG. 4a. As shown in FIG. 4b, the motor's estimated speed ω is a prescribed speed estimated by the estimation unit 25, and the estimated speed and an estimated rotation angle (or a motor's position) generated from the estimation unit 25 are adapted as a real speed and a real rotation angle of the control system of the motor, respectively.

Referring to FIG. 4b, the estimated speed ω denoted by a solid line has many more ripples Δω than the reference speed ω* denoted by a dotted line. A magnitude of the compensation signal $\Delta i^*_q$ generated from the speed compensator 37 is determined on the basis of the magnitude of the ripple component Δω.

FIG. 4c is a graph for depicting the compensation signal $\Delta i^*_q$ on a time axis. A rotation angle θ denoted under the compensation signal $\Delta i^*_q$ is adapted to graphically illustrate the compensation signal $\Delta i^*_q$ variable with the rotation angle of the motor. In this case, the magnitude Δ of the compensation signal $\Delta i^*_q$, is greatly affected by the magnitude of the ripple component Δω shown in the speed characteristic graph of FIG. 4b.

Figure 5:
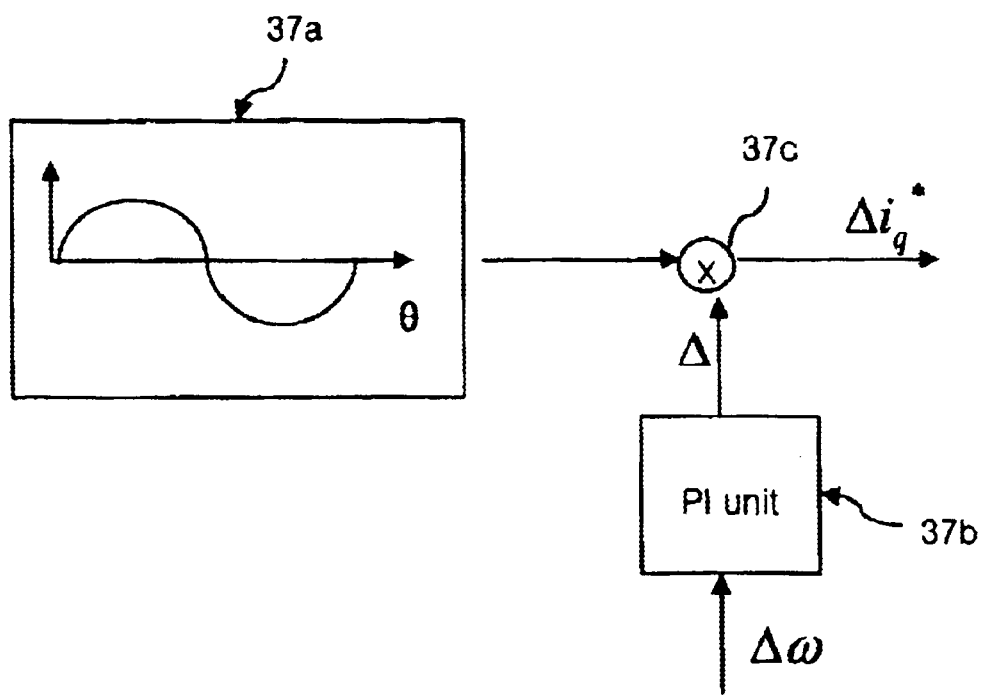
FIG. 5 is a detailed circuit diagram of a speed compensator shown in FIG. 3.

FIG. 5 is a detailed circuit diagram of the speed compensator 37 shown in FIG. 3.

Referring to FIG. 5, the speed compensator 37 may include a lookup unit 37a for inserting a fundamental wave component of the compensation signal considering both a ripple component generated in the load characteristics of the motor and a ripple component Δω generated in the speed characteristics into a lookup table, a PI (Proportional Integral) unit 37b for determining the magnitude Δ of the compensation signal $\Delta i^*_q$ in the direction of reducing the ripple component Δω generated in the speed characteristics, and a combiner 37c for combining an output signal of the lookup unit 37a with an output signal of the PI unit 37b to generate the compensation signal $\Delta i^*_q$.

Typically, an output signal of the speed controller 32 is a current $i^*_q$ serving as a current command of q-axis of a rotation coordinates system. The current command is commonly indicated as a DC (Direct Current) value such that it has a limitation in reducing the ripple component Δω caused by the load characteristics. Therefore, there is a need for the speed compensator 37 to apply the compensation signal considering torque characteristics to the output signal $i^*_q$ of the speed controller 32.

As shown in FIG. 4a, the relationship among the load characteristics, the ripple component, and the rotor's rotation angle are determined when constructing a compressor. In more detail, in the case where the configuration of the compressor is established simultaneously maintaining a prescribed relative distance between a rotor and vanes of the motor, a constant relationship among the load characteristics, the ripple component, the rotation angle car be established.

The speed compensator 37 generates a compensation signal by referring to the lookup unit 37a having a fundamental wave component considering the constant relationship, and thereby compensates the fundamental wave component caused by the ripple component.

In addition, the control system for the motor further includes limiters 38a and 38b for limiting minimum/maximum values of the reference magnetic flux voltage $V^*_d$ and the reference torque voltage $V^*_q$ that are applied to the rotation/fixed coordinates converter 23, thereby obtaining stability in the output signals $V^*_d$ and $V^*_q$ of the current controller 36.

Figure 6:
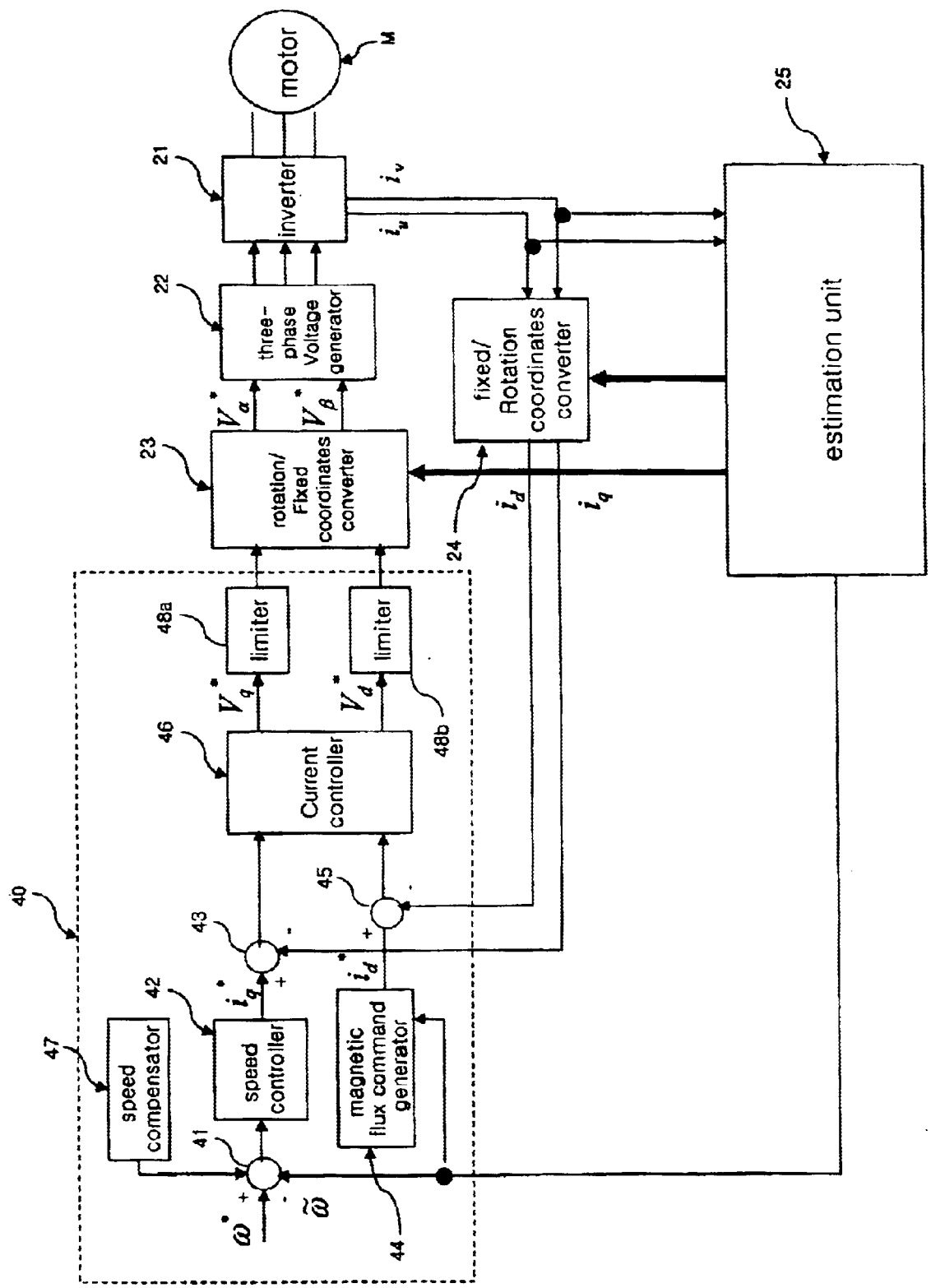
FIG. 6 is a block diagram of a control system of a motor in accordance with another preferred embodiment of the present invention.

FIG. 6 is a block diagram of a control system of a motor in accordance with another preferred embodiment of the present invention. Referring to FIG. 6, the control system of the motor M includes a three-phase voltage generator 22 for enabling an inverter 21 to drive the motor M according to a control signal of a microcomputer (not shown) by applying a three-phase voltage to the inverter 21, a rotation/fixed coordinates converter 23 for converting a reference magnetic flux voltage $V^*_d$ and a reference torque voltage $V^*_q$ of a rotation coordinates system of the motor M into a magnetic flux voltage $V^*_\alpha$ and a torque voltage $V^*_\beta$ of a fixed coordinates system, and outputting the magnetic flux voltage $V^*_\alpha$ and the torque voltage $V^*_\beta$ to the three-phase voltage generator 22, a fixed/rotation coordinates converter 24 for converting a three-phase current ($i_u$, $i_v$, $i_w$) applied from the inverter 21 to the motor M into a two-phase current so as to convert currents of a fixed coordinates system into currents of a rotation coordinates system, and an estimation unit 25 for estimating a rotation angle and rotor speed of the motor M upon receiving currents $i_u$ and $i_v$ applied to the fixed/rotation coordinates converter 24, and outputting the estimated rotation angle and rotor speed of the motor M to the rotation/fixed coordinates converter 23 and the fixed/rotation coordinates converter 24.

The control system further includes a control block 40. The control block 40 includes a first subtracter 41 for generating a difference between a reference speed $\omega^*$ of the motor M and an estimated speed $\omega$ generated from the estimation unit 25, a speed controller 42 for generating a reference torque current $i^*_q$ controlling a speed of the motor M upon receiving the difference between the reference speed $\omega^*$ and estimated speed $\omega$ from the first subtracter 41, a second subtracter 43 for generating a difference between the reference torque current $i^*_q$ and a real torque current $i_q$, a magnetic flux command generator 44 for controlling a magnetic flux according to the estimated speed $\omega$ to generate a reference magnetic flux current $i^*_d$, a third subtracter 45 for generating a difference between the reference magnetic flux current $i^*_d$ and a real magnetic flux current $i_d$, a current controller 46 for generating a reference magnetic flux voltage $V^*_d$ and a reference torque voltage $V^*_q$ according to output signals of the second subtracter 43 and the third subtracter 45, and outputting the reference magnetic flux voltage $V^*_d$ and the reference torque voltage $V^*_q$ to the rotation/fixed coordinates converter 23, and a speed compensator 47 for outputting a compensation signal $\Delta\omega^*$ compensating ripples, generated in speed difference signals generated from the first subtracter 41 due to loads of the motor M, to the first subtracter 41.

The speed compensator 47 is configured using the same principle as in FIG. 3 showing the first embodiment, however, differently from the speed compensator 37 of FIG. 3, it outputs a compensation signal $\Delta\omega^*$ serving as a compensation value for a speed command value instead of a compensation value for a current command value to the first subtracter 41.

In the same manner as the motor of the first preferred embodiment shown in FIG. 3, the motor in accordance with another preferred embodiment of the present invention may further include limiters 48a and 48b for limiting minimum/maximum values of the reference magnetic flux voltage $V^*_d$ and the reference torque voltage $V^*_q$ that are applied to the rotation/fixed coordinates converter 23, thereby obtaining stability in the output signals $V^*_d$ and $V^*_q$ of the current controller 46.

A method for controlling the motor will hereinafter be described in detail.

A difference between a reference speed and an estimated speed of the motor is generated at step (a).

A reference torque current for controlling a motor's speed according to the speed difference generated at step (a) is generated while controlling a magnetic flux according to the estimated speed of the motor such that it generates a reference magnetic flux current at step (b).

A difference between the reference torque current and a real torque current of the motor is generated and at the same time a difference between the reference magnetic flux current and a real magnetic flux current is generated at step (c), such that ripples caused by the motor's loads do not exist in the reference torque current generated from the above step (b).

A reference magnetic flux voltage and a reference torque voltage are generated depending on the difference values of the above step (c), and then transmitted to a three-phase voltage generator for outputting a three-phase voltage to an inverter driving the motor at step (d).

Finally, the inverter controls at step (e) the motor using the three-phase voltage received at the above step (d).

In more detail, the step (c) includes the steps of: c1) referring to a lookup table which stores a fundamental wave component of a compensation signal considering both a ripple component generated in the load characteristics of the motor and a ripple component generated in the speed characteristics; c2) determining a magnitude of the compensation signal in the direction of reducing the ripple component generated in the speed characteristics; and c3) generating a compensation signal according to the determination results of the steps (c1) and (c2), and removing ripples caused by the motor's loads from a difference between the reference torque current and the real torque current.

Further, in order to remove ripples caused by the motor's loads from a difference between the estimated speed and the reference speed at step (a) instead of at step (c), a compensation signal may be generated with reference to the lookup table, such that the ripples existing in the difference between the estimated speed and the reference speed may be removed.

As apparent from the above description, a control system for the motor according to the present invention includes a three-phase voltage generator for outputting a three-phase voltage to an inverter driving the motor, a rotation/fixed coordinates converter for converting a reference magnetic flux voltage and a reference torque voltage of a rotation coordinates system of the motor into data of a fixed coordinates system, and outputting the data to the three-phase voltage generator, and a fixed/rotation coordinates converter for converting a three-phase current applied from the inverter to the motor into a two-phase current so as to convert currents of the fixed coordinates system into currents of the rotation coordinates system. In addition, the control system of the motor further includes an estimation unit for estimating a rotation angle and rotor speed of the motor upon receiving currents applied to the fixed/rotation coordinates converter, and a control block for receiving the estimated rotation angle and the estimated speed from the estimation unit, and outputting the reference magnetic flux voltage and the reference torque voltage of the motor to the rotation/fixed coordinates converter so as to compensate an error caused by loads generated when driving the motor. Therefore, the control system for the motor greatly reduces noise and vibrations of a compressor without being affected by loads generated by compression/expansion strokes of the compressor at a startup time of the motor, and prevents a performance of the compressor from being deteriorated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling a motor, comprising:
   a three-phase voltage generator for outputting a three-phase voltage to an inverter driving the motor;
   a rotation/fixed coordinates converter for converting a reference magnetic flux voltage and a reference torque voltage of a rotation coordinates system of the motor into data of a fixed coordinates system, and outputting the data to the three-phase voltage generator;
   a fixed/rotation coordinates converter for converting a three-phase current applied from the inverter to the motor into a two-phase current so as to convert currents of the fixed coordinates system into currents of the rotation coordinates system;
   an estimation unit for estimating a rotation angle and rotor speed of the motor upon receiving currents applied to the fixed/rotation coordinates converter; and
   a control block for receiving the estimated rotation angle and the estimated speed from the estimation unit, outputting the reference magnetic flux voltage and the reference torque voltage, in which an error caused by loads when driving the motor is compensated, to the rotation/fixed coordinates converter.

2. The system as set forth in claim 1, wherein the control block includes:
   a first subtracter for generating a difference between a reference speed of the motor and a motor's estimated speed estimated by the estimation unit;
   a speed controller for generating a reference torque current controlling a speed of the motor upon receiving the difference between the reference speed and the estimated speed from the first subtracter;
   a second subtracter for generating a difference between the reference torque current and a real torque current;
   a magnetic flux command generator for generating a reference magnetic flux current by controlling a magnetic flux according to the estimated speed;
   a third subtracter for generating a difference between the reference magnetic flux current and a real magnetic flux current;
   a current controller for generating a reference magnetic flux voltage and a reference torque voltage according to an output difference generated from the third subtracter; and
   a speed compensator for outputting a compensation signal compensating ripples generated in the reference torque current generated from the speed controller to the second subtracter.

3. The system as set forth in claim 2, wherein the speed compensator generates the compensation signal according to loads recognized by the rotation angle of the motor's rotor.

4. The system as set forth in claim 2, wherein the speed compensator generates the compensation signal on the basis of a ripple waveform generated at the estimated speed of the motor.

5. The system as set forth in claim 4, wherein the compensation signal and the ripple waveform are 180 degrees out of phase with each other.

6. The system as set forth in claim 4, wherein the speed compensator includes:
   a lookup unit for inserting a fundamental wave component of the compensation signal considering both a ripple component generated in load characteristics of the motor and a ripple component generated in speed characteristics into a lookup table;
   a PI (Proportional Integral) unit for determining a magnitude of the compensation signal in a direction of reducing the ripple component generated in the speed characteristics; and
   a combiner for combining an output signal of the lookup unit with an output signal of the PI unit to generate the compensation signal.

7. The system as set forth in claim 1, wherein the control block includes:
   a first subtracter for generating a difference between a reference speed of the motor and a motor's estimated speed estimated by the estimation unit;
   a speed controller for generating a reference torque current controlling a speed of the motor upon receiving the difference between the reference speed and the estimated speed from the first subtracter;
   a second subtracter for generating a difference between the reference torque current and a real torque current;
   a magnetic flux command generator for generating a reference magnetic flux current by controlling a magnetic flux according to the estimated speed;
   a third subtracter for generating a difference between the reference magnetic flux current and a real magnetic flux current;
   a current controller for generating a reference magnetic flux voltage and a reference torque voltage according to an output difference generated from the third subtracter; and
   a speed compensator for outputting a compensation signal compensating ripples, generated in speed difference signals generated from the first subtracter due to loads of the motor, to the first subtracter.

8. The system as set forth in claim 7, wherein the speed compensator generates the compensation signal according to loads recognized by the rotation angle of the motor's rotor.

9. The system as set forth in claim 7, wherein the speed compensator generates the compensation signal on the basis of a ripple waveform generated at the estimated speed of the motor.

10. The system as set forth in claim 9, wherein the compensation signal and the ripple waveform are 180 degrees out of phase with each other.

11. The system as set forth in claim 9, wherein the speed compensator includes:
   a lookup unit for inserting a fundamental wave component of the compensation signal considering both a ripple component generated in load characteristics of the motor and a ripple component generated in speed characteristics into a lookup table;
   a PI (Proportional Integral) unit for determining a magnitude of the compensation signal in a direction of reducing the ripple component generated in the speed characteristics; and a combiner for combining an output signal of the lookup unit with an output signal of the PI unit to generate the compensation signal.

12. A method for controlling a motor, comprising the steps of:
   a) generating a difference between a reference speed and an estimated speed of the motor;
   b) generating a reference torque current for controlling a motor speed according to the speed difference generated at the step (a) simultaneously controlling a magnetic flux according to the estimated speed of the motor, and generating a reference magnetic flux current;
   c) generating a difference between the reference magnetic flux current and a real magnetic flux current simultaneously with generating a difference between the reference torque current and a real torque current of the motor, and thus compensating ripples that are generated in the reference torque current generated at the step (b) by the motor;
   d) generating a reference magnetic flux voltage and a reference torque voltage according to individual differences generated at the step (c), and transmitting the reference magnetic flux and the reference torque voltage to a three-phase voltage generator adapted to output a three-phase voltage to an inverter driving the motor; and
   e) allowing the inverter to control the motor upon receiving the three-phase voltage generated at step (d).

13. The method as set forth in claim 12, wherein the step (c) includes the steps of:
   c1) referring to a lookup table which stores a fundamental wave component of a compensation signal considering both a ripple component generated in load characteristics of the motor and a ripple component generated in speed characteristics;
   c2) determining a magnitude of the compensation signal in the direction of reducing the ripple component generated in the speed characteristics; and
   c3) generating a compensation signal according to the determination results of the steps (c1) and (c2), and removing ripples caused by the motor's loads from a difference between the reference torque current and the real torque current.

14. A method for controlling a motor, comprising the steps of:
   a) generating a difference between a reference speed and an estimated speed of the motor in order to compensate a ripple component generated in the estimated speed due to loads of the motor;
   b) generating a reference torque current for controlling a motor speed according to the speed difference generated at the step (a) simultaneously controlling a magnetic flux according to the estimated speed of the motor, and generating a reference magnetic flux current;
   c) generating a difference between the reference magnetic flux current and a real magnetic flux current simultaneously with generating a difference between the reference torque current and a real torque current of the motor;
   d) generating a reference magnetic flux voltage and a reference torque voltage according to individual differences generated at the step (c), and transmitting the reference magnetic flux and the reference torque voltage to a three-phase voltage generator adapted to output a three-phase voltage to an inverter driving the motor; and
   e) allowing the inverter to control the motor upon receiving the three-phase voltage generated at step (d).

15. The method as set forth in claim 14, wherein the step (c) includes the steps of:
   c1) referring to a lookup table which stores a fundamental wave component of a compensation signal considering both a ripple component generated in load characteristics of the motor and a ripple component generated in speed characteristics;
   c2) determining a magnitude of the compensation signal in the direction of reducing the ripple component generated in the speed characteristics; and
   c3) generating a compensation signal according to the determination results of the steps (c1) and (c2), and removing ripples caused by the motor's loads from a difference between the reference speed and the estimated speed.

* * * * *